Figures 1, 2:
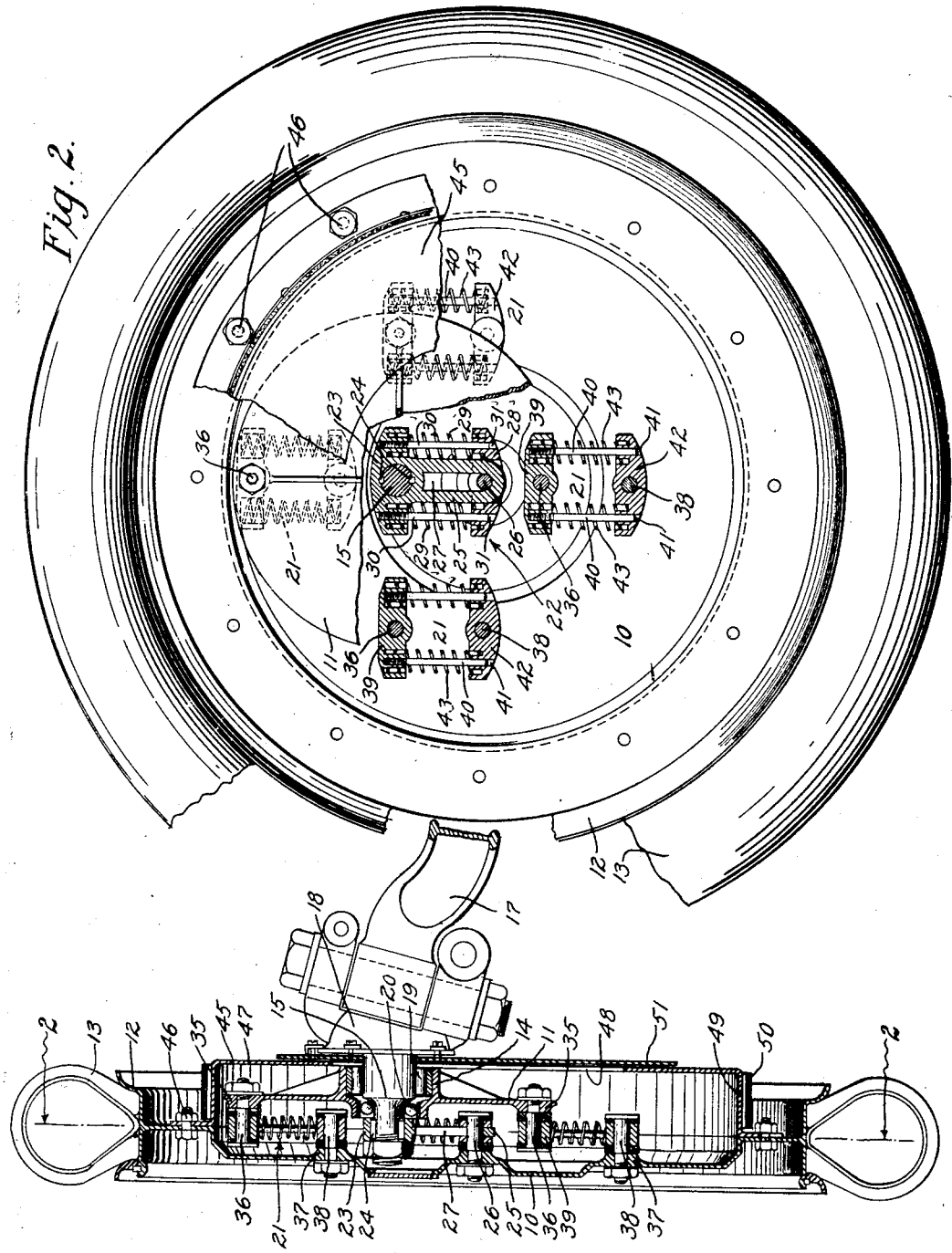

Oct. 14, 1930.   J. J. NOVAK   1,778,463
RESILIENT WHEEL
Filed May 29, 1928

INVENTOR
Julius J. Novak
BY Morrison, Kennedy & Campbell
ATTORNEYS.

Patented Oct. 14, 1930

1,778,463

UNITED STATES PATENT OFFICE

JULIUS J. NOVAK, OF ELMHURST, NEW YORK

RESILIENT WHEEL

Application filed May 29, 1928. Serial No. 281,433.

This invention relates to ground or road wheels for automobiles, aeroplanes, and the like, and has particular reference to resilient wheels having shock-absorbing qualities.

Prior to this invention a number of different types of resilient wheels have been proposed but they have given rise to objectons for several reasons. Some of them have employed telescopic radial spokes and springs in which the compressive and tensile forces are successively taken by the spoke springs as they roll into vertical position, and the load is not uniformly distributed to the various springs. Other forms of wheels have employed flat springs of various shapes, in which also the springs in the vertical center take most of the load. Due to the fact that the load is not evenly distributed at all times, the springs must be of substantial proportions, and many in number, making the wheels very heavy, clumsy, and expensive, and this coupled with their instability has rendered them unsatisfactory for general use.

An important object of this invention is to provide a resilient wheel in which a plurality of springs are arranged to act synchronously during the entire revolution of the wheel.

Another object of the invention is to provide such a wheel in which the shock absorbing means are encased within the wheel, whereby to be protected from the injurious action of dust and other foreign substances.

Another object is to provide such a device which will be simple in construction, strong and durable in service, of relatively light weight, neat in appearance, and constituting a substantial advance in the art.

These and other objects, features, and advantages of the invention will be readily understood from the following description in connection with the accompanying drawings, wherein one form of the invention has been shown by way of illustration, and wherein, Fig. 1 is a vertical transverse sectional view through one form of resilient wheel embodying the invention; and Fig. 2 is an elevation of the wheel partly in section on line 2—2 of Fig. 1.

Referring particularly to the drawings, it will be seen that the illustrated embodiment of the invention comprises a main disc 10 and a supplementary disc 11 which are spaced from each other in parallel planes, but with their centers or axes offset with reference to each other. The main disc 10 is provided on its periphery with a tire rim 12, of any ordinary or preferred form, for the accommodation of a tire 13, which may be either pneumatic or solid as desired. The supplementary disc 11 is disposed at or adjacent to the inner face of the wheel and is provided with a substantially central hub 14 which is rotatably mounted on a spindle 15 of an axle 17. In Fig. 1 the spindle 15 is shown as being a part of a steering knuckle 18 such as is employed in conventional front axles of automobiles and the like, but it is to be understood that the invention is not restricted in this respect since it may be equally well applied to rear axles of automobiles, or to trailers, aeroplanes, etc. Any desired type of anti-friction bearings may be employed to journal the spindle 15 in the hub 14, the illustrated embodiment including a roller bearing at 19 and thrust ball bearing at 20.

Articulating the rim 12 and hub 14, preferably through the discs 10 and 11, are a plurality of shock-absorbing units 21 which are disposed in radially spaced relation about the axes of the discs, and a similar central shock-absorbing unit 22. These shock-absorbing units constitute, in effect, parallel acting links or spokes which yieldably and resiliently connect the hub and rim, and are so arranged as to evenly divide the load on the wheel, and each unit supporting its proportional share of the load throughout the entire revolution of the wheel. The eccentric relationship of the two discs 10 and 11 is such that their axes are in substantially vertical alinement, and they are thus maintained in such relationship at all times by the central unit or master link 22 as will now be described.

This central shock-absorbing unit may preferably comprise a T-shaped member having a head portion 23 which is keyed as at 24 to the spindle 15 whereby to be maintained in fixed position, together with a depending shank 25 which extends past the axis of the wheel disc 10. A stud 26 is secured centrally in the disc 10 and extends into a vertical slot 27 in the shank 25, said slot guiding the stud in the course of relative vertical movement of the two discs 10 and 11 and limiting such relative movement to practical limits. Also secured to the wheel disc 10 but rotatable with reference thereto is a spring seat member 28 mounted in spaced opposition to the head portion 23 of the master link, and through which the shank 25 is slidable. Compression springs 29 are interposed between the head portion 23 and the spring seat member 28, and if desired, guide rods 30 may be secured in the head portion 23 in such a manner as to slide through openings 31 in the spring seat member 28 as relative movement takes place. From this it will be clear that the compression springs 29 normally maintain the stud 26 yieldingly against the lower end of the slot 27, and that the disc 10 and rim 12 are rotatable about the stud 26.

At suitable spaced intervals, equidistant from the axis of the spindle 15, the supplementary disc 11 is provided with bosses 35 in which are anchored the outwardly extending studs 36, and similarly the main disc 10 is provided with bosses 37 for the anchorage of a corresponding number of cooperating studs 38. Each of the studs 36 is in vertical alinement with one of the studs 38, such alinement being constantly maintained by virtue of the anchorage of the master link to the spindle, and the studs 36 and 38 thus arranged in pairs constitute the foundations of the several shock-absorbing units 21 which are rotatable about the central unit or master link. Journaled on each of the studs 36 is a spring pad 39, carrying pilot rods 40 which slidably engage in apertures 41 in similar spring pads 42 on the studs 38, and compression springs 43 are interposed between the respective spring pads 39 and 42, such springs preferably surrounding the pilot rods 40. The springs 43 assist the springs 29 in supporting the load on the wheel, and by virtue of the parallel action of the several link units, each spring will act continuously and uniformly throughout the entire revolution of the wheel. At the same time the pilot rods 40 maintain the disc 10 against lateral movement or displacement with reference to the disc 11.

A drum or casing member 45 may preferably be secured as by fastening means 46 to the main disc 10, said drum including an annular wall 47 having a central opening 48 to accommodate the spindle 15, and a circumferential wall 49 which, if desired, may function as a brake drum in cooperation with a friction brake band 50, conventionally shown in Fig. 1. The opening 48 in the wall 47 must necessarily be quite large because of the eccentric relation between the discs 10 and 11, and in order to cover said opening, a stationary plate 51 may be secured to the steering knuckle or spindle 15, said plate being larger than the opening 48 and being in substantially sealing engagement with the annular drum wall 47.

When mounted for use, the parts are assembled in the relation shown in the drawings, in which condition, as previously stated, the load is divided evenly between the various springs 29 and 43. As the wheel disc 10 is caused to rotate, it carries the shock-absorbing units 21 with it, and these in turn, transmit rotary movement to the disc 11. In view of the anchorage of the master link or central shock-absorbing unit 22, the rotating springs will always be maintained in parallel relation, and therefore will function continuously and uniformly as parallel yielding spokes. In riding over rough parts of a road, or the like, the yielding connection permits relative movement between the rim and the hub and the springs absorb the shocks and return the parts to their normal positions.

Any suitable means may be provided for lubricating the studs and other relatively movable parts within the wheel, either with oil or grease as by the Alemite system, but as this constitutes no salient feature of the invention it has not been illustrated.

It is to be understood that a greater or less number of shock-absorbing units can be employed, dependent entirely upon the size of wheel, space available, weight to be borne, etc., such modifications being within the capability of skilled designers. The improved wheels may be used either with or without regular chassis suspension springs, dependent upon the degree of resiliency required.

From the foregoing it will be evident that a substantial advance has been made in the art, by providing a wheel having resilient load-bearing, shock-absorbing means built into it. The construction is extremely simple, being capable of economical production, and strong and durable in service. Obviously the invention is susceptible of numerous modifications other than those specifically mentioned, and the right is herein reserved to make such changes as fall within the scope of the appended claims without departing from the spirit of the invention.

Having thus described my invention, what I claim is:

1. A wheel of the class described, comprising a rotatable hub, a rim, and parallel resilient spokes connecting the hub and the rim, said spokes being substantially vertical and rotatable and being adapted to maintain their parallel relation during the complete revolution of the wheel.

2. A wheel of the class described, comprising a main disc and rim, a rotatable hub portion, and a plurality of constantly parallel and substantially vertical resilient spokes connecting the hub portion with the rim, said spokes being protectively concealed by the main disc.

3. In a device of the class described, a pair of spaced parallel discs, and a plurality of parallel links forming a resilient connection between said discs said links being disposed in a direction transverse to the axes of the discs.

4. In a device of the class described, a pair of spaced parallel discs, and a plurality of parallel links forming a resilient connection between said discs, said links being arranged substantially vertically and maintaining said relationship throughout the complete revolution of the wheel.

5. In a device of the class described, a pair of spaced parallel discs, a wheel rim carried by one of the discs, a hub carried by the other disc, a plurality of rocking members arranged in pairs on the opposing faces of the discs, and yielding connections between the rocking members of each pair.

6. A road wheel having a plurality of revolving shock absorbers attached thereon, said shock absorbers rotating about a centrally fixed shock absorber.

7. A road wheel having a plurality of revolving yielding units attached thereon said units rotating about a centrally fixed yielding unit.

8. A road wheel having a plurality of revolving yielding units attached thereon said units rotating about a central yielding unit which is fixed to the hub shaft.

9. A road wheel having a plurality of revolving yielding units attached thereon and said yielding units comprising spring seat rockers and springs to react with the load, and, a substantially central link to check and limit upward movement.

10. In a wheel of the class described, a wheel rim, a hub having a fixed axis eccentrically disposed with reference to that of the wheel rim, and continuously acting yielding connections between the hub and the wheel rim.

11. In a wheel of the class described, a wheel rim, a hub having a fixed axis eccentrically disposed with reference to that of the wheel rim, and continuously acting shock-absorbing units connecting the hub with the wheel rim.

12. In a wheel of the class described, a wheel rim, a hub having a fixed axis eccentrically disposed with reference to that of the wheel rim, and continuously acting parallel link units yieldingly connecting the hub with the wheel rim, the load on the wheel being uniformly divided by said parallel link units.

13. In a wheel of the class described, a main wheel disc having a tire rim on its periphery, a supplementary disc having a substantially central hub eccentrically disposed with reference to the main wheel disc, a substantially central yielding link connection between said discs whereby each disc is rotatable about its own axis, and a plurality of radially spaced parallel acting shock absorbing units articulating the two discs and adapted to revolve about the central link connection.

14. A road wheel having a plurality of yielding units attached thereon, said units rotating about a centrally fixed unit and means to support said units against lateral movement.

15. A road wheel having a plurality of yielding units attached thereon, said units rotating about a centrally yielding unit which is fixed to the axle shaft and means to support said central unit against lateral movement.

In testimony whereof, I have affixed my signature hereto.

JULIUS J. NOVAK.